United States Patent [19]
Woodward

[11] Patent Number: 5,883,488
[45] Date of Patent: Mar. 16, 1999

[54] METHOD AND APPARATUS FOR MULTISPEED HYBRID START SWITCH FOR A MOTOR

[75] Inventor: Arthur E. Woodward, Manchester, Mo.

[73] Assignee: Emerson Electric Co., St. Louis, Mo.

[21] Appl. No.: 686,702

[22] Filed: Jul. 26, 1996

[51] Int. Cl.$^6$ .................................................. H02J 3/14
[52] U.S. Cl. ........................... 318/786; 318/772; 318/779
[58] Field of Search ................................. 318/775, 777, 318/789, 793, 781, 785, 794, 812, 822, 814, 778, 729, 799

[56] References Cited

U.S. PATENT DOCUMENTS

| | | | |
|---|---|---|---|
| 3,906,316 | 9/1975 | Zurad . | |
| 4,030,008 | 6/1977 | Buckle et al. | 318/772 |
| 4,030,009 | 6/1977 | Halsted . | |
| 4,066,937 | 1/1978 | Pfarrer et al. | 318/775 |
| 4,254,343 | 3/1981 | Miller . | |
| 4,341,987 | 7/1982 | Fisher . | |
| 4,388,581 | 6/1983 | Bhatnagar | 318/789 |
| 4,422,030 | 12/1983 | McAllise . | |
| 4,443,749 | 4/1984 | Douthart et al. . | |
| 4,467,257 | 8/1984 | Douthart et al. . | |
| 4,468,604 | 8/1984 | Zaderej . | |
| 4,672,284 | 6/1987 | Ward . | |
| 4,761,601 | 8/1988 | Zaderej . | |
| 4,947,098 | 8/1990 | Vlasak | 318/775 |
| 5,013,990 | 5/1991 | Weber | 318/814 |
| 5,051,681 | 9/1991 | Schwarz . | |
| 5,146,146 | 9/1992 | Samann . | |
| 5,170,110 | 12/1992 | Vlasak . | |
| 5,227,710 | 7/1993 | Lewus | 318/781 |
| 5,333,474 | 8/1994 | Imai et al. . | |
| 5,391,971 | 2/1995 | Yamada et al. . | |
| 5,514,943 | 5/1996 | Shapess . | |

Primary Examiner—John W. Cabeca
Attorney, Agent, or Firm—Howell & Haferkamp, L.C

[57] ABSTRACT

A multi-speed switching device particularly suitable for providing multi-speed starts for a motor, especially a two-speed motor, is provided with a high-reliability solid state switch for controlling a phased start winding of the motor, and an inexpensive switch for accommodating a lesser number of starts at an auxiliary speed. The high-reliability switch is a triac switched off during every motor start as the motor comes up to an operating speed. The inexpensive switch is an electromechanical relay that switches between a main run winding and an auxiliary speed run winding, and which is energized by voltage appearing across the solid state switch when it is switched off. Operation at the main speed is selected by energizing a first circuit terminal, while operation at the auxiliary speed is selected by energizing a second circuit terminal, the switch of the relay normally connecting the second circuit terminal to the main run winding when the relay coil is not energized and to the auxiliary run winding when the relay coil is energized. The switch contacts of the relay are not energized except when the motor is started for auxiliary speed operation, which thereby enhances the reliability of the relay. Because a relay is used instead of a centrifugal switch, reliability is further enhanced. The device and its method of operation are adaptable to motors having more than two speeds, with minor modifications and extensions.

38 Claims, 3 Drawing Sheets

METHOD AND APPARATUS FOR MULTISPEED HYBRID START SWITCH FOR A MOTOR

BACKGROUND OF THE INVENTION (1) Field of the Invention

This invention relates generally to motor control systems and more specifically to methods and devices for starting and controlling a motor having at least two speeds.

(2) Description of the Prior Art

In various applications of capacitor-start motors, it is necessary to provide multiple speed operation. For example, a washing machine may be required to provide operation at a pair of speeds, such as a first speed for general loads, and a second, slower speed for delicate loads. A typical application employs a two-speed motor and provides a selectable start speed, i.e., the motor can be started for operation at one of a pair of speeds, and the motor runs at that speed until it is stopped. Usually, one of the speeds is used more frequently than the other. Thus, a switching device that provides high reliability when used to start the motor at the more frequently used speed, and that provides an economical way to accommodate a lesser number of starts at the less frequently used speed could advantageously be used in this application.

A dual-speed motor for use in this type of application typically has a first run winding having a first number of poles to provide a first motor speed, a separate start winding having the same number of poles to start the motor, and a second run winding having a second, different number of poles to provide a second motor speed. The motor is started by energizing the first run winding and the separate start winding. As the motor increases its speed, the start winding is typically switched off and, based upon the selected speed of the motor, either the first run winding continues to be energized, or else the first run winding is deenergized and the second run winding is energized. Usually, the number of poles of the second winding is greater than the number of poles of the first winding, making the motor's second speed lower than its first speed. A motor of this type can be used with a dual-speed switching arrangement to provide multiple speed operation of an electrical appliance, such as the washing machine mentioned above.

Traditionally, a mechanical centrifugal actuator switch has been used to drop out the start winding of a single-speed motor upon reaching run speed. However, a centrifugal actuator used in this manner functions every time the motor is started. The relatively limited lifetime of the contacts and mechanisms of this type of mechanical switch (typically around 100,000 to 300,000 or fewer operations), as well as the fact that the centrifugal actuator must be mounted on the rotor of a motor, makes the use of a centrifugal actuator switch undesirable for some applications. Adapting such a switch for two speed operation, while possible, is not preferable where high reliability is required for at least one speed.

One example of a prior art motor with a dual-speed switching arrangement is described in U.S. Pat. No. 4,443,749 to Douthart et al. The control circuit described therein has one power terminal connected to a two pole main winding of a motor, and another power terminal connected to a four pole main winding. The four pole main winding is connected to the power terminal through a solid state gated switch, which is normally open. One of the power terminals of the control circuit is connected to a power supply line, depending upon the desired operating mode. In either operating mode, power is also supplied through a triac to a start winding, causing the motor to start.

When power is applied to the terminal representing the two pole operating mode, a solid state switch prevents power from being applied to the four pole winding, and the motor starts as a two-pole motor. When a conventional mechanical centrifugal switch attached to the rotor opens, power is removed from the start winding and the motor continues to run as a two-pole motor, because the two pole run winding remains energized. On the other hand, when power is applied to the terminal representing the four pole operating mode, a solid state switch once again prevents power from being applied to the four pole winding, so the motor starts as a 2-pole motor. However, when the centrifugal switch opens in this operating mode, power is removed from the two pole run winding and the main power path of the triac in the start winding circuit, simultaneously disconnecting both the two pole run winding and the start winding. Power is then applied to the solid state switch associated with the four pole winding, so that the switch turns on and supplies power to the four pole winding. The motor then operates as a four pole motor.

The circuit of Douthart et al. '749 provides a motor that can be started at two different speeds, but requires a conventional mechanical centrifugal switch to accomplish this purpose. As noted above, these switches require placement of actuator mechanisms on the rotor of the motor, and thus, it may be physically inconvenient to supply the necessary space for this switch. Also as noted above, mechanical centrifugal switches have relatively limited operational lifetimes. In the Douthart et al. '749 circuit, the latter problem may be exacerbated because the centrifugal switch contacts always switch power when the motor is operated, irrespective of the selected mode of operation. Arcing during switching operations tend to wear down switch contacts, or may cause them to weld together. It would therefore be desirable to avoid the use of mechanical centrifugal switches altogether, or at least to avoid the frequent switching of power through electromechanical contacts.

Related U.S. Pat. No. 4,467,257 to Douthart et al. describes a circuit in which a two-pole run winding, a four-pole run winding, and a start winding are provided. Power is supplied by one of two power terminals, depending upon the desired motor operation mode. As in Douthart et al. '749, a conventional mechanical centrifugal switch is used to switch between the speeds after start-up. The centrifugal switch switches power only during the four-pole (i.e., the slower) operating mode, which provides some improvement in reliability over the circuit arrangement of Douthart et al. '749, but the centrifugal switch actuator still must be inconveniently mounted on the rotor, and reliability could be further improved through total elimination of the centrifugal switch. Another disadvantage of this circuit is that it requires two high-current solid state switches and a transformer, the latter being required to operate a gate of one of the solid state switches. It would be advantageous to reduce the total number of high current solid state switches to reduce heat sinking and isolation requirements.

U.S. Pat. No. 5,514,943 to Shapess describes a motor control system having a first speed circuit and a second speed circuit. Both circuits are connected to a switching device that controls the flow of current to each circuit. The first speed circuit includes a first speed primary winding, a first speed secondary winding, a start capacitor, and a start relay. The second speed circuit includes a second speed winding. The motor control system initially engages the first speed circuit regardless of which speed of operation is selected. The switching device closes its contacts to excite the first speed circuit, and a start relay is closed for a predetermined amount of time to excite a start circuit that provides power to the secondary winding. In high speed operation, the switching device keeps the first speed circuit active, while holding the second speed circuit inactive. In low speed operation, the switching device deactivates the first speed circuit after the motor starts, while activating the second speed circuit. No specific types of switches are disclosed in this reference for the switching device, which is described only as any device that may be capable of manually, mechanically, or electrically opening or closing an electrical circuit. Shapess '943 does not teach or suggest solutions to the issues of reliability of the switching devices, how such devices might automatically operate at appropriate times during the start of the motor, or how a device that controls current in a start winding might cooperate with a switch to control current through the main windings after the motor has started.

U.S. Pat. No. 4,030,008 to Buckle et al. describes a motor having a high speed main run winding, a start winding, and a low speed main winding. A selector switch, in conjunction with an on/off power switch, provides for the selection of high speed or low speed operation. For high speed operation, the selector switch and power switch are set to complete a circuit through the high speed main winding. Current through the high speed winding energizes a first relay coil, causing the relay's contacts to close, which energizes the start winding and starts the motor. As the speed of the motor increases, current through the high speed winding decreases until the relay drops out (i.e., the contacts open), which interrupts the flow of current through the start winding. For low speed operation, the switches are set to first energize the low speed winding through a triac. (The stated function of the triac is to inhibit the flow of current in the low speed main winding when the motor is suddenly switched to low speed operation from high speed operation). The current flowing through the low speed winding causes a second relay's contacts to close, which energize the high speed main winding, which, in turn, causes the first relay's contacts to close, which energizes the high speed start winding. The energizing of the start winding causes the motor to start, which decreases the flow of current in the low speed winding to a point at which the second relay drops out, which shuts off the current flow to both the high speed main winding and the start winding.

The starter circuit described in Buckle et al. is thus fully controlled by electromechanical relays, the triac being used only to inhibit the flow of current in the low speed main winding when the motor is suddenly switched to low speed. Thus, it is necessary to switch power through at least one relay irrespective of the mode in which the motor is started, making the reliability of the starter circuit essentially equal to the reliability of the powered relay contacts. As discussed above, these contacts are subject to damage from arcing and even possible welding with each powered switch cycle. Furthermore, all three windings in the Buckle et al. circuit are energized during a motor start, which undesirably increases the current requirement of the motor as it comes up to speed.

The disclosure of U.S. Pat. No. 4,030,009 to Halsted '009 is essentially similar to that of Buckle et al. '008, except that the former does not disclose any circuitry to inhibit the flow of current in the low speed main winding when the motor is suddenly switched to low speed from high speed operation.

While dual speed capacitor-start motors and circuitry are shown in the above noted prior art references, they do not teach or suggest a switching device in the starting circuitry with the desirable feature of being able to accommodate a large number of starts at a first speed with high reliability, while economically accommodating a lesser number of starts at a second speed, without substantially reducing the reliability of starts at the first speed. It would also be desirable for such a switching device to avoid the use of mechanical centrifugal switches, which have relatively low reliability and which must have an actuator mounted on the moving part of the machine. It would additionally be desirable for such a switch to not require more than one power switching solid state device to thereby avoid excessive heat sinking requirements or complex isolation circuitry to operate, and for the switch to provide automatic switching between modes of operation during start-up when required without unnecessarily increasing the starting current required by the motor.

SUMMARY OF THE INVENTION

The present invention comprises a hybrid start circuit for a capacitor start motor that uses a combination of a logic-controlled solid state switch and an electromechanical relay to permit a motor to be started and to run at one of a pair of selected speeds. The circuit provides a very reliable switch for a large number of starts at a first speed, and a low cost way to accommodate starts at a less frequently used auxiliary speed. The invention also comprises a corresponding method for starting a capacitor start motor.

According to a first aspect of the invention, the invention comprises a hybrid start switch for a two-speed motor, said motor having a main run winding for frequent service, an auxiliary run winding for less frequent service, and a start winding, said switch comprising an electronic switch for connection in circuit with the start winding for selective energization of the start winding, a relay having a coil in circuit with the electronic switch and a relay contact for connection in circuit between a power input terminal and the two run windings so that when the hybrid start switch is connected to said two-speed motor and energized, opening of the electronic switch activates the relay coil to throw the relay contact to thereby energize the auxiliary run winding, if the power input terminal is energized.

According to another aspect of the invention, the invention comprises a two-speed motor with integrally mounted hybrid start switch, said motor having a main run winding for frequent service, an auxiliary run winding for less frequent service, and a start winding, said switch comprising an electronic switch connected in circuit with the start winding for selective energization of the start winding, a relay having a coil in circuit with the electronic switch and a relay contact connected in circuit between a power input terminal and the two run windings so that when the hybrid start switch is connected, opening of the electronic switch activates the relay coil to throw the relay contact to thereby energize the auxiliary run winding, if the power input terminal is energized.

According to yet another aspect of the invention, the invention comprises a method for controlling a multispeed motor having a phased start winding, a main run winding for operation at a first speed and an auxiliary run winding for operation at an auxiliary speed, the method comprising the steps of:

a) connecting the start winding and the main run winding to a source of power so that respective operating currents flow through the main run winding and the phased start winding;

b) switching off the operating current through the phased start winding as the motor reaches a predetermined run speed;

c) actuating a switch in response to the start winding operating current being switched off to thereby switch the applied power from the main run winding to the auxiliary run winding if the auxiliary speed is selected.

These and other aspects of the invention are described in greater detail below.

It is therefore an object of the invention to provide a switching device for a dual speed motor that can accommodate a large number of starts at a first speed with high reliability, and that can accommodate a lesser number of starts at a second speed economically.

It is another object of the invention to provide a switching device in which the use of an economical switch to accommodate operation at a less frequently used speed does not substantially affect the reliability of the switching device for operation at a more frequently used speed.

It is a yet another object of the invention to provide a multi-speed switching device for a motor that does not require a mechanical centrifugal switch that offers only a limited lifetime and that must have actuator components mounted on the rotor of the motor.

It is a further object of the invention to provide a multi-speed switching device for a motor that does not require a plurality of solid-state switching devices requiring bulky heat sinks, extra isolation circuitry (such as transformers), or both to operate.

It is a still further object of the invention to provide a switch having one or more of the aforementioned advantages, and that is capable of automatically switching from a start-up mode to a run mode, e.g., from four-pole start-up mode to six-pole run mode, at an appropriate time as the motor comes up to speed.

It is yet another object of the invention to provide a switch having one or more of the aforementioned advantages, and which does not unnecessarily and undesirably increase the current requirement of the motor as it comes up to speed.

The manner in which these and other objects of the invention are achieved will become apparent to those skilled in the art from the following detailed description, when read in conjunction with the drawings.

DETAILED DESCRIPTION OF THE PREFERRED EMBODIMENT

Figure 1:
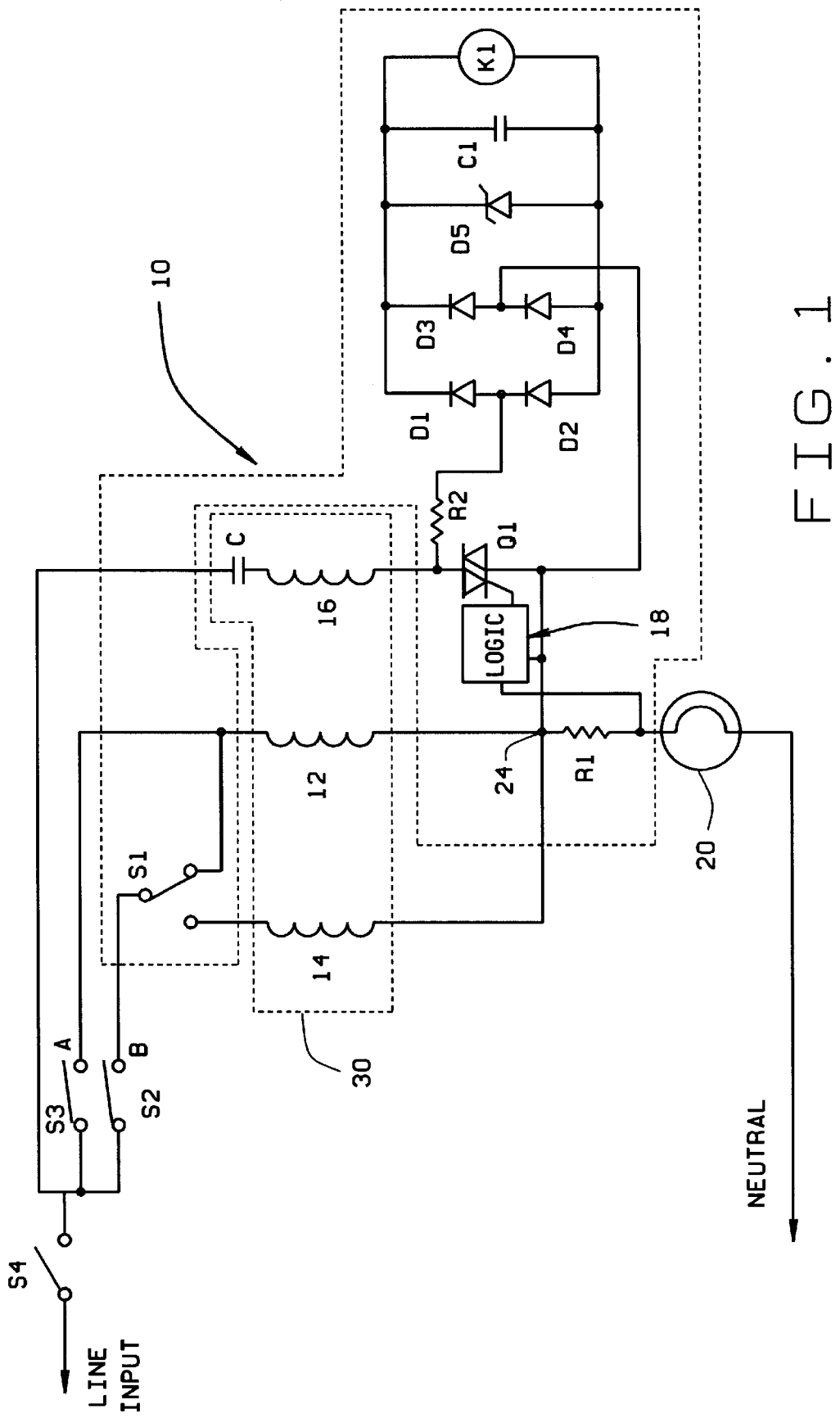
FIG. 1 is a schematic diagram of a two-speed switch in accordance with the preferred embodiment of the invention.

A schematic diagram of the preferred embodiment of the invention is shown in FIG. 1.

Control circuitry shown generally within box 10 is provided for controlling a capacitor-start motor (electrical portions of which are shown schematically within box 30) having a plurality of speeds. These speeds are provided by a first run winding 12 and a second run winding 14. In a preferred embodiment, these windings represent four-pole and six-pole windings, respectively, however the number of poles in the run windings 12 and 14 can vary depending upon the application, and are not to be considered a limitation of the invention. Also provided is a phased start winding comprising start winding 16 in series with capacitor C, the value of which can readily be selected by one skilled in the art, knowing the properties of the motor. However, 200 $\mu$F is a representative value. Start winding 16 and capacitor C operate in conjunction with run winding 12 in a conventional manner to provide a starting torque and direction for the motor, the remainder of which is not shown in FIG. 1. In a preferred configuration using an Emerson Electric Co. (St. Louis, Mo.) Model C68TRS4419 high-volume two speed washer motor, start winding 16 typically draws about 8 Amperes when powered at a line voltage of 115 volts. A conventional protective element 20, such as a Therm-O-Disk (Mansfield, Ohio) part no. 20ME08ME, is preferably provided to protect against overcurrent conditions in the motor windings, but protective element 20 is not a part of, nor is it required to practice the invention.

The control circuit 10 in the preferred embodiment comprises a sensing resistor R1, a logic circuit 18, a triac Q1, a resistor R2, a Zener diode D5, a capacitor C1, a relay comprising relay coil K1 and switch S1, and a diode bridge comprising four diodes D1–D4. Triac Q1 can be any triac (or equivalent switching device or circuit) capable of switching the current through start winding 16 at the rated line voltage, that can withstand the expected transients. Such devices are well-known in the art, however, a specific triac that is suitable for the circuit of FIG. 1 is an SGS Thompson BTB16-600BW, which is rated at 16 Amperes and 600 volts. A 10 or 12 Ampere triac rated at 400 volts would also be adequate for the particular motor described above, as well. Sensing resistor R1 can be a 0.35 ohm resistor or any other suitable value for sensing current flowing in the neutral line without substantially disturbing the operation of the circuit. Capacitor C1 is preferably a 10 $\mu$F capacitor, for reasons discussed below. The relay that includes coil K1 and switch S1 can be Hasco Components, Inc. (Bellerose Village, N.Y.) part no. HAT901CSDC24, which has a 24 volt DC coil and contacts rated at 30 Amperes. It has a sealed case for ease of processing the circuit board, but an open or covered style relay could be used, depending upon cost. Because the preferred Hasco relay coil draws only about 35 mA at 24 volts, diodes D1–D4 may be general purpose 1N4004 diodes, which are rated at 1 A at 400 v and are sufficient to handle the necessary current and line voltages. The design and construction of logic circuit 18 will be recognized as being well within the capabilities of one of ordinary skill in the art, and requires only that it be able to sense the change of voltage across resistor R1 and that it supply a signal to turn triac Q1 on until the motor approaches its operating speed. For example, analog or digital circuitry including comparators that can sense a voltage across resistor R1 and control the gate of triac Q1 in accordance with the sensed voltage may be used for logic circuit 18. Logic circuit 18 might also include other circuitry for developing a DC voltage that is used internally. However, the internal circuitry used for logic circuit 18 is not considered to be a part of this invention. The run speed of the motor is selected by energizing one of two power input terminals labelled A and B in FIG. 1.

Switch S4 is a conventional on/off switch for turning the motor on and off. Switches S2 and S3 select the desired run speed of the motor. In the embodiment of FIG. 1, where run winding 12 represents a four-pole run winding and run winding 14 represents a six-pole run winding, terminal A represents a high-speed terminal, and terminal B represents a low-speed terminal. When terminal A is energized, power is applied to the four-pole run winding 12 and the four-pole start winding 16 (the latter through switch S4, capacitor C, and triac Q1). Logic circuit 18 generates a signal that turns on triac Q1. A torque is thus applied to the motor, causing it to accelerate towards an operating speed. Current also flows through current sensing resistor R1, which may be in the neutral line as shown, or at least in series with run winding 12. As the motor comes up to speed, the current flowing through resistor R1 will drop. Logic circuit 18 senses this change and ceases to produce the signal that turns on triac Q1, thereby shutting off the starting current through the four pole start winding 16. Power for logic circuit 18 may be derived in any suitable manner (not shown in FIG. 1) as would be known to those of ordinary skill in the art.

When triac Q1 is shut off, the voltage across it is applied to the diode bridge comprising diodes D1–D4 through series dropping resistor R2. Resistor R2 is selected to reduce the line voltage to apply 24 volts DC to the relay coil K1 after rectification. Although a single resistor is shown, a resistor/capacitor network may be used instead, the advantage of the network being that it can be designed to dissipate significantly less power. For example, R2 may be a 2500 ohm, 5 watt resistor in the circuit of FIG. 1, but could advantageously be replaced with a 1.0 microfarad capacitor in series with a 220 ohm resistor (neither of which is shown). The selection of the resistor value, its replacement with a network, and also the value of the voltage to be applied to the relay, are, however, design choices within the level of skill in the art that may be influenced by the particular relay selected and coil K1's rated voltage. However, when the resistor/capacitor network is used in place of R2, it has been found that more severe transients appear across Zener diode D5 at least in part as a result of coupling between windings 12, 14 and 16. For this reason, Zener diode D5 should be a type, such as a P6KE30 available from Motorola, General Instruments and others, that is an overvoltage transient suppressor that can protect against such high voltage and high energy transients when the resistor/capacitor network is used in place of resistor R2. (When R2 is a single 2500 ohm resistor, a standard 1 watt 1N4750-type Zener diode is suitable for use at D5.) Capacitor C1, which in the circuit of FIG. 1 is preferably a 10 microfarad capacitor, is selected to provide a small amount of energy storage without delaying relay pull-in. Zener diode D5 is preferably included in parallel with the DC capacitor C1 and relay coil K1 on the output of the diode bridge D1–D4 to clamp the DC voltage applied to relay coil K1 so that excess voltage is not applied to the relay, as might happen with some operation modes with certain motor configurations because of coupling between windings 12, 14 and 16.

It will be readily appreciated by those skilled in the art that the network in FIG. 1 that powers relay coil K1 when conduction through triac Q1 is shut off can be replaced with a different circuit designed to accomplish the same purpose, and that various design changes may be made in the illustrated circuit without compromising either the spirit of the invention or the basic function of the control circuit. However, the circuits specifically illustrated and described herein are preferred at the present time because they are believed to be economical and practical for high-volume production of highly reliable consumer appliances, such as clothes washing machines.

In the circuit of FIG. 1, switch S1 represents the form C (SPDT) contact of relay K1, and is controlled thereby. Suitable, inexpensive relays for use in this circuit can readily be purchased in which the contacts herein referred to as "switch S1" have a rated lifetime of 10 million mechanical operations, and a minimum of 100,000 operations when switching full rated power. The Hasco relay described above meets these specifications.

Returning to the description of the operation of the circuit when terminal A is powered, it will be observed that, even though relay coil K1 is eventually energized by diode bridge D1–D4, the contacts of switch S1 never carry any current, since the "common" terminal of switch S1 is connected to terminal B, which is connected to an open circuit. Therefore, the operation of the relay has no effect on either the operation of the speed control circuit 10 or the motor. Furthermore, because switch S1 is rated for 10 million mechanical operations, and because the logic circuit 18 and triac Q1 can readily be selected or constructed from highly reliable solid-state devices by one skilled in the art, it will be noted that switching circuit 10 can easily be constructed to have an expected lifetime of millions of starts (in the present case, starts for high speed operation) from terminal A.

When the motor is energized by the application of power to terminal B rather than terminal A (which in this circuit, represents a low-speed start), run winding 12 and start winding 16 are initially energized in the same manner as described above, because switch S1 is normally in the "Start" position (as shown in FIG. 1). The operation of the circuit and the motor proceeds in the same manner as though the A terminal had been energized, until relay coil K1 is energized. When this occurs, switch S1 is switched to the "Run" position, causing run winding 14 (the low-speed winding) to be energized and run winding 12 (the high-speed winding) to be deenergized. The motor thus operates after start-up at the speed corresponding to run winding 14 (in this case, the low-speed winding). Enough current remains flowing in start winding 16 when triac Q1 is turned off to supply the approximately 35 mA of current required by relay coil K1 to ensure that switch S1 remains in the "Run" position. (When start winding 16, as here, is not carrying sufficient current to contribute significantly to the torque of the motor, especially as compared to the torque contributed by another winding, start winding 16 shall, for convenience, be said to be "turned off" and current through the circuit branch containing start winding 16 shall be said to be "shut off" for purposes of this explanation and the claims below, even though a small current is flowing through start winding 16 and the circuit branch containing it. This small amount of current is much less than the current flowing when triac Q1 is turned on, and has essentially no effect on the operation of the motor.)

When terminal B is powered, it will be observed that, when S1 switches from the "Start" to the "Run" position, its relay contacts are powered. Because the electromechanical relay comprising coil K1 and switch S1 is rated at a lifetime of approximately 100,000 to 200,000 operations when switch S1 is switching full rated power, and because the other components of switch 10 are solid state devices, the factors that determine the operating lifetime of switching circuit 10 in this mode are dominated by the rated lifetime of the relay. However, for many typical applications in which starts at an auxiliary speed are infrequent (such as the low-speed cycle of a washing machine), a lifetime rating of 100,000 to 200,000 starts at the auxiliary speed provides a fully adequate service life. Thus, control circuit 10 provides an economical, long-life two-speed switch for these applications.

Another advantage of switching circuit 10 is that it does not require excessive heat sinking or extra isolation circuitry because only one triac Q1 is used. In addition, no mechanical switch actuators need be mounted on rotating elements, thereby saving space on possibly critical areas of these elements. Also note that the arrangement of switch S1 mechanically prevents the simultaneous flow of current through both run windings 12 and 14 during a start at the auxiliary speed, so the start current requirement for the motor is reduced relative to prior art circuits that permit these run windings to be simultaneously energized. The entire switching circuit 10 can be mounted on a printed circuit (PC) board, which can be configured for mounting on or in the motor being controlled, such as in or on an end bell (end shield) of the motor.

Figure 2:
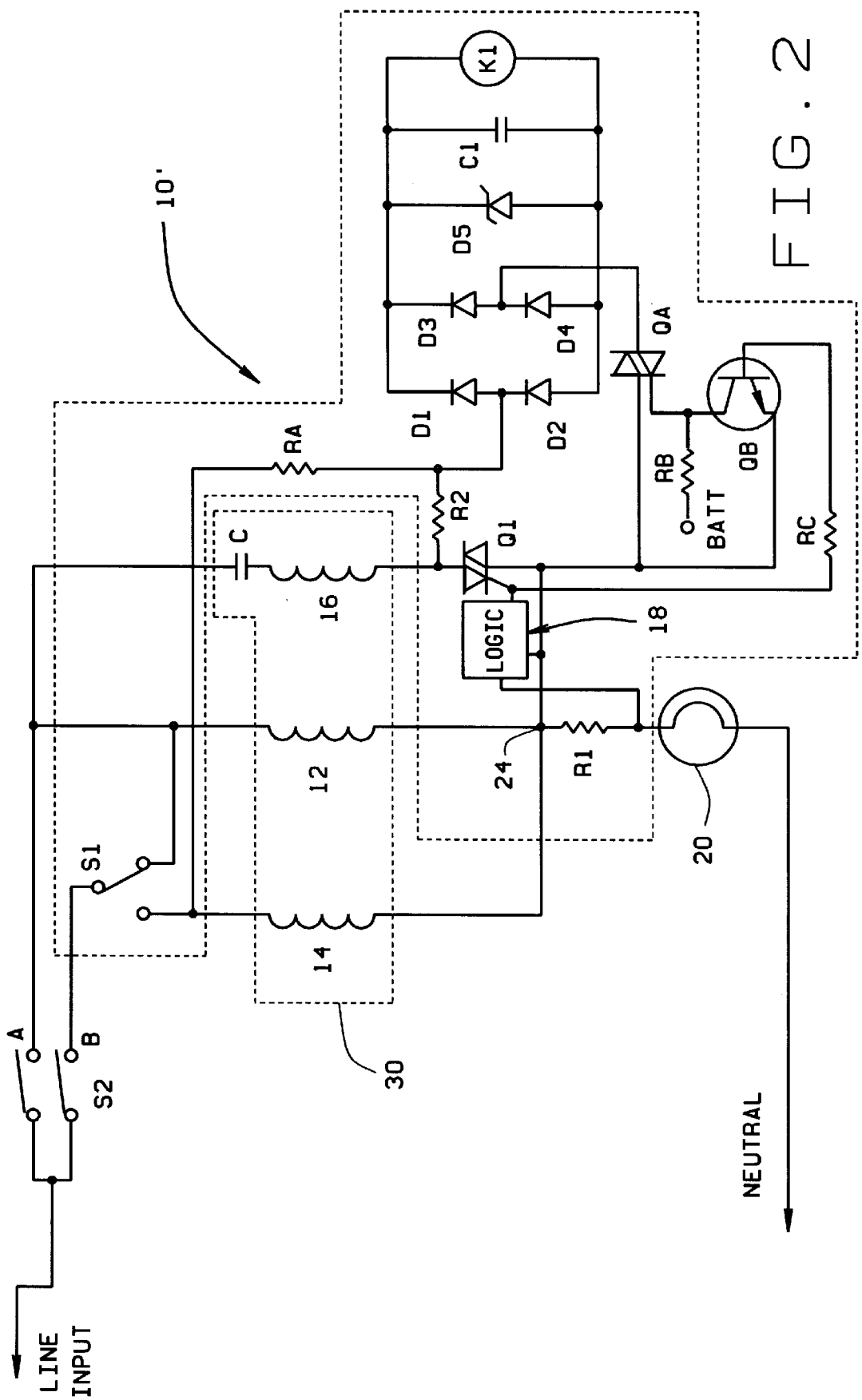
FIG. 2 is a schematic diagram of an alternative embodiment of a two-speed switch in accordance with the invention that may be particularly useful in field replacement applications.

FIG. 2 is a schematic diagram of a slightly modified control circuit 10' that is useful not only in original equipment, but also as a field replacement control unit in installations commonly encountered that lack a separate on/off switch S4 and hence, a separate path for line input to start winding 16. In this type of installation, either switch S2 or S3 is closed (but not both), to select run speed. (Switch S2 and S3 might instead be a single three-position switch with an "off" position.) The operation of modified control switch 10' is similar to that of control circuit 10 of FIG. 1, except that, when the motor is started with switch S2, current flow through relay K1 is maintained through resistor RA (which may be a 4.3K resistor, for example, if the Hasco Components relay described above is used) to keep relay K1 coil energized when switch S1 switches to the auxiliary winding. (Capacitor C1 stores sufficient energy to ensure that the relay does not "chatter" before the switch to the auxiliary winding actually occurs.)

An additional modification shown in FIG. 2 is the addition of a switch comprising triac QA, transistor QB, and resistors RB and RC. Transistor QB, together with resistors RB and RC, form an inverter that ensures under normal operating conditions that, when triac Q1 is on, triac QA is off, and vice versa. (BATT represents a connection to a power source that could be, for example, a positive voltage supply for logic element 18 derived from the line input voltage.) It will readily be seen that relay coil K1 is energized only when triac Q1 is off (i.e., nonconducting) and triac QA is on (i.e., conducting). The inverter comprising transistor QB and resistors RB and RC ensures that under normal conditions, relay coil K1 and switch S1 are operated appropriately.

RC and QB keep the voltage from BATT through resistor RB from turning QA on if logic circuit 18 senses that the main winding must be reenergized. However, the logic circuit should be configured to do that only if it senses that the motor has slowed down to the point where the start winding should be energized again. Note that the logic circuit 18 can try to turn on triac Q1, but if there is no power to the capacitor C and start winding 16, nothing will happen. With QA and RC connected as shown, QA will be turned off when the logic tries to turn on Q1. This will drop out relay K1 and put power back on the four pole run winding 12 and four pole start winding 16 until logic circuit 18 is satisfied that the motor is running fast enough to turn off start winding 16 by not firing triac Q1.

Although a glitch or line voltage sag could drop the voltage at BATT far enough for triac QA to not fire, it is preferable for logic circuit 18 to decide whether the run winding 12 and the start winding 16 should be energized again, because the parameter that logic circuit 18 measures is influenced by the actual motor load including inertia. Thus, logic circuit 18 can call for both the run winding 12 and the start winding 16 to be reenergized long before a power supply dip would do so.

It is a significant advantage that logic circuit 18 can constantly monitor sense resistor R1 to determine whether the run winding 12 and the start winding 16 should be reenergized, since, in the past, start windings have been energized only for brief periods at the start of operation, usually by automatically timed periods each time power is applied. On the other hand, logic circuit 18 can be configured to make its decisions based on the motor current, and therefore, the speed of the motor, as indicated by that current. In this respect, logic circuit 18 can replicate the behavior of a centrifugal start switch by reenergizing both the run and start windings when the motor speed drops below a predetermined value.

Triac QA and transistor QB can be low power components selected from a wide variety of commonly available devices. The selection of appropriate resistance values for resistors RB and RC is well within the ordinary skill in the art.

Aside from reliability advantages, switching circuit 10' offers an operational advantage over other control circuits in that relay coil K1 provides a delay between the opening of the circuit through start winding 16 and the transfer from run winding 12 to run winding 14 effected by switch S1. This delay results in a reduction of current through switch S1 when it opens because, by then, the current flow through start winding 16 has been effectively extinguished. This reduction in the amount of current switched by switch S1 increases the lifetime of the switch contacts, and it has been observed experimentally that the lifetime of the relay that includes coil K1 and switch S1 usually exceeds that of a mechanically-operated centrifugal switch in a circuit in which the centrifugal switch replaces triac Q1.

The invention is not limited to the particular embodiments discussed above, and other variations that meet at least some of the objects of the invention will become apparent to those skilled in the art upon reading this disclosure. For example, rather than relying upon a potential developed across triac Q1 when it is nonconductive to provide a source for powering relay coil K1, logic circuit 18 could, instead, be modified to provide the operating current for relay coil K1. However, this modification would require that logic circuit 18 be able to supply relay coil K1 with the necessary current to cause switch S1 to switch to the "Run" position, necessitating a more substantial power supply for logic circuit 18. No such requirement exists in the circuit of FIG. 1.

It is also possible to replace triac Q1 with any other suitable electronic, mechanical, or electromechanical switch. For example, triac Q1 could be replaced by a centrifugal actuator switch, which would eliminate the need for logic circuit 18 and sensing resistor R2. However, mechanical switches used in the circuit at this position are typically much less reliable than the triac Q1 shown in FIGS. 1 and 2. More specifically, as mentioned above, it has been found that, when started repeatedly in low-speed mode (i.e., applying power to terminal B), the relay comprising coil K1 and switch S1 has more often than not outlasted the centrifugal actuator switch. In addition, the centrifugal actuator switch requires mounting of the centrifugal actuator on the motor's rotor and the switch contacts in close proximity on the end shield of the motor, while the triac can be mounted in any convenient location.

Another possible modification of FIG. 1 is the replacement of relay coil K1 and switch S1 with an electronic switch, which, of course, would necessitate additional circuit modifications, as would be understood by one skilled in the art. The replacement of electromechanical switch S1 with an all-electronic switch might result in an increase in switch reliability, but may require additional heat sinks, isolation circuitry, or both.

Yet another modification of the circuit of FIG. 1 that may be possible with some motors with substantial mutual coupling between the motor windings would be to connect circuit terminal A to both the main run winding 12 and the phased start winding comprising capacitor C and start winding 16 so that both circuit branches receive operating power from terminal A. In this case, switch S4 could be omitted, and switches S2 and S3 could be replaced by a single 3-position switch (which can be referred to as S2', not shown in the Figures) with an "off" position. In the auxiliary speed position of switch S2', when S1 switches to energize auxiliary speed winding 14, it would be necessary for the mutual coupling between winding 14 and winding 16 to be sufficient to keep coil K1 energized so that switch S1 remains in that position. Of course, if this modification does not work, the modified circuit of FIG. 2 may be used.

Also note that a triac QA can be added in series with R2 and the diode bridge. Triac QA is controlled in a manner similar to that shown in FIG. 2. One particular reason for making such a substitution is if there is a delay from the time the line input is first connected to the motor until a sufficient voltage (BATT) is developed for logic element 18 to operate triac Q1 properly. In this case, a triac QA can be added with a resistor RB connected to QA as shown in FIG. 2, with a Zener diode connected in series with RB between the BATT supply and the control gate of QA. (Transistor QB and resistor RC are from FIG. 2 are not required for this modification to FIG. 1.) For an appropriately selected Zener diode, triac QA will remain nonconductive until the BATT voltage reaches an operating level sufficient to ensure that logic element 18 properly operates triac Q1, thereby ensuring that relay coil K1 is not energized inappropriately at start-up, thereby ensuring that the auxiliary speed 14 is not prematurely or inappropriately energized, and that the main speed winding 12 is not prematurely switched off.

Figure 3:
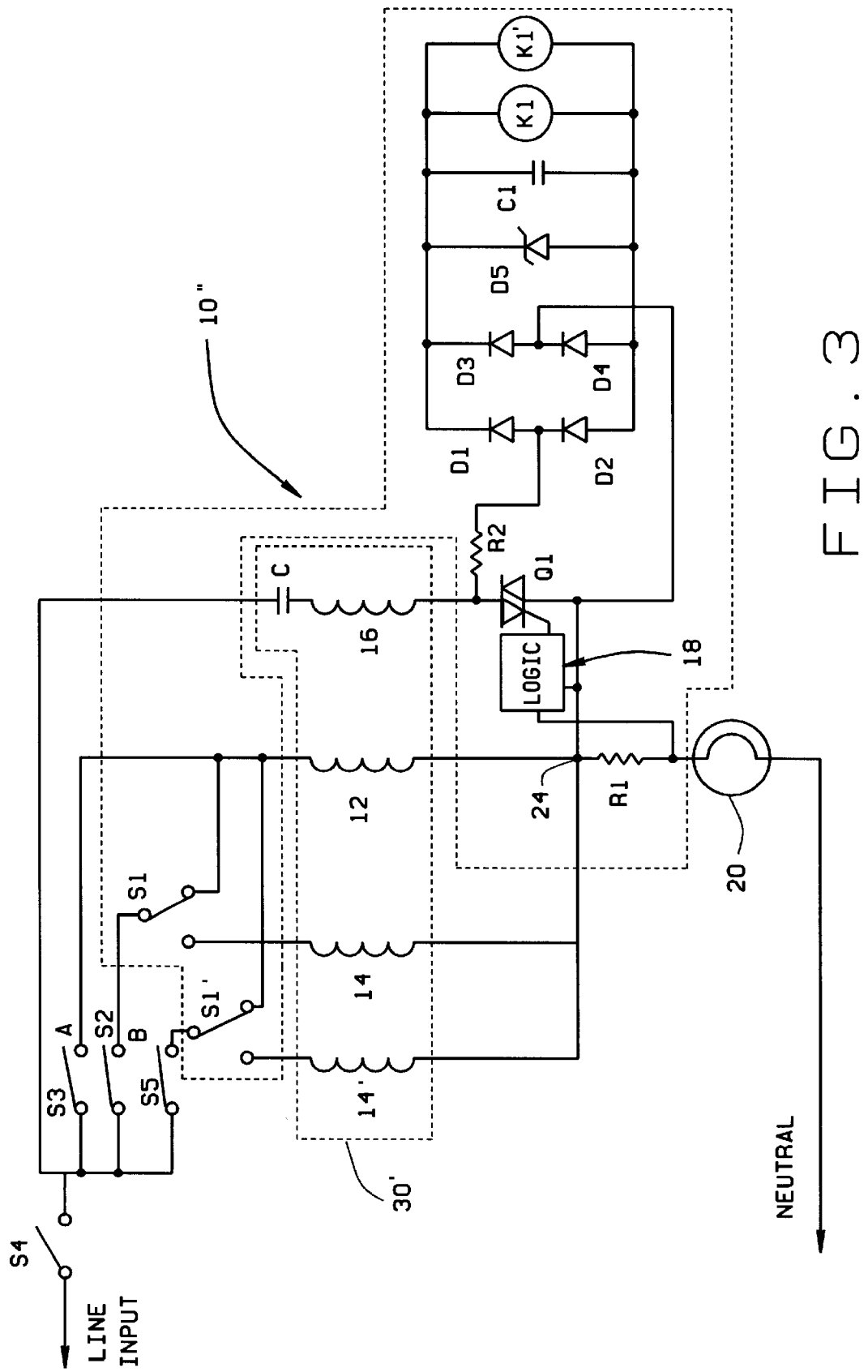
FIG. 3 is a schematic diagram of an alternative embodiment of a three-speed switch in accordance with the invention, showing how the invention may be generalized to applications requiring more than two run speeds.

Although both the embodiments illustrated in FIGS. 1, 2, and 3 show capacitor start motors, it will be well-understood by those skilled in the art that other motor types may be used, and that the application of the invention is not limited to the particular motor type used. By way of example only, and not to be taken as an exclusive list of such other motor types, the invention is equally applicable to split-phase and capacitor start/capacitor run motors as well.

The embodiments illustrated in FIGS. 1 and 2 show a resistor R1 as a sensor. However, it will be understood by those skilled in the art that, rather than a resistor R1 to sense current, a direct speed-measuring sensor could be used, instead. A nonexhaustive list of examples of such sensors include a DC tachometer; an optoelectronic sensor such as one that has a toothed wheel on the rotor shaft and an opto-interrupter unit on the stator; a Hall-effect sensor mounted on the stator with a magnet wheel on the rotor shaft; and a centrifugal actuator system such as those in use today, but with an input provided to a Hall sensor or photoelectric device. Another type of alternative sensor that could be used is an indirect speed sensor, that could measure the current and determine speed based upon previously learned or measured current versus speed relationships, as is done in the present preferred embodiments. For example, such a sensor might measure voltage across the start winding (e.g., as is done in U.S. Pat. No. 4,030,009 to Halsted) by the potential sensitive relays; or it could measure the phase relationship between voltage and current through the motor, although this type of sensor may require a microprocessor to operate. With any indirect measurement technique, the results can be very application sensitive, and different techniques may be needed for different types of motors. Of course, if any of these alternative sensors are used instead of resistor R1, there would be no need to provide resistor R1, or to place any such resistor in series with the motor windings.

As would be apparent to those skilled in the art upon reading this specification, the present invention can be generalized to accommodate more than two run speeds. For example, if the motor being controlled provides a third speed with yet an additional auxiliary winding, it would be necessary to add another relay and to adjust the value of R2 to provide current to drive the second relay coil. Alternatively, a two-pole relay could be used, depending upon which approach is most cost-effective.

A clothes washing machine, for example, may provide four, six, and eight pole motor speeds as shown in FIG. 3. In this case, motor circuitry is shown within box 30' and the inventive control circuitry generally is shown within box 10". An additional switch S5 would normally be provided to select the second auxiliary run speed in such washing machines, although any type of switch could replace switches S2, S3 and S5 as a group, provided that it provides an function equivalent to operating only one of these switches at a time, as would normally be the case in a multispeed washing machine. A relay comprising coil K1' and switch S1' is added to the inventive circuitry to perform a function for the second auxiliary speed winding 14' corresponding to that performed by the relay comprising coil K1 and switch S1 with respect to the first auxiliary speed winding 14. Alternately, it will be recognized that a single coil K1 could operate both switches S1 and S1'. The circuit of FIG. 2 may also be modified in a similar way to accommodate a third speed winding, with the further addition of another resistor RA' (not shown) that would draw power from the third speed winding to keep the relay or relays energized. Since the RA and R2 resistors would form a voltage divider with the new RA' resistor, it may be necessary or advantageous to provide each of these resistors with their own diode half-bridge (D1 and D2) for feeding power to the associated relay or relays without being loaded down by the other resistors and windings. (Because there could be one relay coil K1 throwing both switches S1 and S1' when relay coil K1 is activated, or two relay coils K1 and K1' associated respectively with switch S1 and S1', it is convenient notationally to refer to switches S1 and S1' as being part of a "relay assembly" comprising at least one coil connected in circuit with the electronic switch.)

Of course, many other variations, such as routine substitution of component values and ratings and/or replacement of components and subcircuits by other equivalent components and subcircuits having appropriate values and ratings can be made by one skilled in the art upon reading this disclosure. Also possible are many routine variations in circuit topology. Many such modifications too numerous to specifically describe are possible within the scope and spirit of the invention. Therefore, the scope of the invention is not to be limited by the description of the embodiments above, but rather solely by the claims enumerated below, wherein it will be understood that the term "multispeed motor" may refer to a motor having two speeds, or to one having more than two speeds.

What is claimed is:

1. A hybrid start switch for a multispeed motor, said motor having a main run winding for frequent service, an auxiliary run winding for less frequent service, and a start winding, said windings being connected in parallel, said hybrid start switch comprising:

an electronic switch for connection in circuit with the start winding for selective energization of the start winding; and a relay having a coil in circuit with the electronic switch and a relay contact for connection in circuit between a power input terminal and the two run windings, so that when the hybrid start switch is connected to said multispeed motor and the motor is energized, opening of the electronic switch activates the relay coil to throw the relay contact to thereby energize the auxiliary run winding, if the power input terminal is energized.

2. The hybrid start switch of claim 1 further comprising a logic element connected between a sensor and the electronic switch, said logic element configured for controlling the electronic switch in response to the sensor.

3. The hybrid start switch of claim 2 wherein the sensor is arranged for connection in circuit with all of the motor windings.

4. The hybrid start switch of claim 3 wherein the relay contact is arranged for connection in a normally closed configuration between the main run winding and the power terminal.

5. The hybrid start switch of claim 4 further comprising a plurality of connectors between said hybrid start switch and the multispeed motor.

6. The hybrid start switch of claim 5 further comprising a PC board, said hybrid start switch being mounted on said PC board, and said PC board being configured for mounting to said multispeed motor.

7. The hybrid start switch of claim 6 wherein said multispeed motor drives a clothes washing machine.

8. The hybrid start switch of claim 2 wherein said logic element has means for sensing a voltage drop, said sensor comprising a resistor for producing said voltage drop, and said electronic switch comprises a triac.

9. The hybrid start switch of claim 8 wherein said relay coil is connected in parallel to said triac, and both of said relay coil and triac are arranged for connection in series with the start winding.

10. The hybrid start switch of claim 9 wherein all of said motor windings are connected in parallel, with each of the two run windings having an end connected to a common node, and the triac being arranged for connection between the start winding and said node.

11. The hybrid start switch of claim 10 wherein the relay contact is an SPDT contact with a common terminal arranged for connection to incoming power and its other two terminals being arranged for connection to the two run windings, and being configured as normally closed between said power input terminal and said main run winding.

12. The hybrid start switch of claim 2 and further comprising means in circuit with the auxiliary run winding for continued activation of the relay coil, if the auxiliary run winding is energized.

13. The hybrid start switch of claim 2 wherein the sensor senses a parameter indicative of the motor's operating speed, and further comprising an auxiliary switch in circuit with the relay coil that opens to thereby deactivate the relay coil to energize the main run winding if the power input terminal is energized, when the speed of the motor, as indicated by the parameter sensed by the sensor, drops below a predetermined value.

14. A multispeed motor with a hybrid start switch, said motor having a plurality of windings including at least a main run winding for frequent service, first auxiliary run winding for less frequent service, and a start winding; and said hybrid start switch comprising an electronic switch connected in circuit with the start winding for selective energization of the start winding, and a relay having a coil in circuit with the electronic switch and a first relay contact connected in circuit between a first power input terminal and the main run winding and the first auxiliary run winding;

so that when the motor is energized, opening of the electronic switch activates the relay coil to throw the first relay contact to thereby energize auxiliary run winding, if the first power input terminal is energized.

15. The multispeed motor with hybrid start switch of claim 14 wherein the hybrid start switch is integrally mounted to the motor.

16. The multispeed motor with hybrid start switch of claim 14 and further comprising a sensor in circuit with at least one of the plurality of windings and configured to sense changes in current through said motor, and a logic element responsive to the sensor to operate the electronic switch to control energization of the start winding.

17. The multispeed motor with hybrid start switch of claim 16 wherein the first relay contact is in a normally closed configuration between the main run winding and the first power input terminal.

18. The multispeed motor with hybrid start switch of claim 17 further comprising a PC board, said hybrid start switch being mounted on said PC board, and said PC board being mounted to said multispeed motor.

19. The multispeed motor with hybrid start switch of claim 18 wherein said multispeed motor is mounted in and drives a clothes washing machine.

20. The multispeed motor with hybrid start switch of claim 16 wherein said sensor comprises a resistor for producing a voltage drop in response to said changes in current though said motor, said electronic switch comprises a triac, and said logic element is responsive to said voltage drop for controlling said triac.

21. The multispeed motor with hybrid start switch of claim 20 wherein said relay coil is connected in parallel to said triac, and both of said relay coil and triac are connected in series with the start winding.

22. The multispeed motor with hybrid start switch of claim 21 wherein said plurality of motor windings are connected in parallel with one another, with the main run winding and first auxiliary run winding connected to a common node, and the triac connected in circuit between the start winding and said node.

23. The multispeed motor with hybrid start switch of claim 22 wherein the first relay contact is an SPDT contact with a first, common terminal connected to incoming power, a second terminal connected to the main run winding and a third terminal connected to the first auxiliary run winding, the first relay contact being normally closed between said first power input terminal and said main run winding.

24. The multispeed motor with hybrid start switch of claim 16 and further comprising means in circuit with the first auxiliary run winding for continued activation of the relay coil, if the first auxiliary run winding is energized.

25. The multispeed motor with hybrid start switch of claim 24 wherein the sensor senses a parameter indicative of the motor's operating speed, and further comprising an auxiliary switch in circuit with the relay coil that opens to thereby deactivate the relay coil to energize the main run winding if the first power input terminal is energized, when the speed of the motor, as indicated by the parameter sensed by the sensor, drops below a predetermined value.

26. The multispeed motor with hybrid start switch of claim 16 wherein the multispeed motor is a three-speed motor, the plurality of windings includes a second auxiliary winding that is also for less frequent service, and said hybrid start switch further comprises a second relay contact connected in circuit between a second power input terminal and one of either the main run winding or the second auxiliary winding, depending upon whether the relay coil is activated, so that opening of the electronic switch activates the relay coil to throw both the first relay contact and the second relay contact to thereby energize either the first auxiliary run winding, if the first power input terminal is energized, or the second auxiliary run winding, if the second power input terminal is energized.

27. The multispeed motor with hybrid start switch of claim 26 and further comprising a sensor in circuit with at least one of the plurality of windings and configured to sense changes in current through said motor, and a logic element responsive to the sensor to operate the electronic switch to control energization of the start winding.

28. The multispeed motor with hybrid start switch of claim 27 wherein the sensor is in circuit with all of the motor windings.

29. The multispeed motor with hybrid start switch of claim 27 and further comprising means in circuit with the first auxiliary run winding and the second auxiliary run winding for continued activation of the relay coil, if one of the first auxiliary run winding and the second auxiliary run winding is energized.

30. The multispeed motor with hybrid start switch of claim 27 wherein said logic element is responsive to a voltage drop to control energization of the start winding, said sensor comprises a resistor for producing said voltage drop, and said electronic switch comprises a triac.

31. A method for controlling a multispeed motor having a phased start winding, a main run winding for operation at a first speed and an auxiliary run winding for operation at an auxiliary speed, the method comprising the steps of:
  (a) connecting the phased start winding and the main run winding to a source of power so that operating currents flow through the main run winding and the phased start winding;
  (b) electronically switching off the connection between the phased start winding and the source of power as the motor reaches a predetermined run speed; and
  (c) automatically actuating an electromechanical relay in response to the phased start winding being switched off to thereby switch the applied power from the main run winding to the auxiliary run winding if the auxiliary speed is selected.

32. The method of claim 31, wherein the electronic switching step comprises sensing current through the motor, and operating a triac in response to the sensed current to switch off the connection.

33. The method of claim 31, and further comprising:
  sensing a parameter indicative of an operating speed of the motor; and
  automatically deactivating the electromechanical switch to switch the applied power to the main run winding if the power input terminal is energized, when the speed of the motor, as indicated by the sensed parameter, drops below a predetermined value.

34. A hybrid start switch for a three-speed motor having a main run winding for frequent service, a first auxiliary run winding and a second auxiliary run winding for less frequent service, and a start winding,
  said hybrid start switch comprising an electronic switch for connection in circuit with the start winding for selective energization of the start winding, and a relay assembly having at least one coil in circuit with the electronic switch, a first relay contact for connection in circuit between a first power input terminal and the main and first auxiliary run windings, and a second relay contact for connection in circuit between a second power input terminal and the main and second auxiliary run windings;
  so that when the hybrid start switch is connected to said three speed motor and the motor is energized, opening of the electronic switch activates the at least one coil of the relay assembly to throw both the first relay contact and the second relay contact to thereby energize either the first auxiliary run winding, if the first power input terminal is energized, or the second auxiliary run winding, if the second power input terminal is energized.

35. The hybrid start switch of claim 34 further comprising a logic element connected between a sensor and the electronic switch, said logic element configured for controlling the electronic switch in response to the sensor.

36. The hybrid start switch of claim 35 wherein the sensor is arranged for connection in circuit with all of the motor windings.

37. The hybrid start switch of claim 35 and further comprising means in circuit with the first auxiliary run winding and the second auxiliary run winding for continued activation of the relay coil, if one of the first auxiliary run winding and the second auxiliary winding is energized.

38. The hybrid start switch of claim 35 wherein said logic element has means for sensing a voltage drop, said sensor comprising a resistor for producing said voltage drop, and said electronic switch comprises a triac.

* * * * *